United States Patent [19]
Ho et al.

[11] Patent Number: 5,828,484
[45] Date of Patent: Oct. 27, 1998

[54] MULTIPLE-STAGE OPTICAL KERR GATE SYSTEM

[76] Inventors: Ping-Pei Ho, 240-42 69th Ave., Douglaston, N.Y. 11362; Robert R. Alfano, 3777 Independence Ave., Bronx, N.Y. 10463

[21] Appl. No.: 51,987

[22] Filed: Apr. 26, 1993

Related U.S. Application Data

[62] Division of Ser. No. 784,220, Oct. 30, 1991, Pat. No. 5,227,912.

[51] Int. Cl.⁶ ............................................. H01S 3/10
[52] U.S. Cl. .................... 359/258; 359/328; 359/329; 359/330
[58] Field of Search .................. 359/258, 328, 359/329, 330

[56] References Cited

U.S. PATENT DOCUMENTS

| | | | |
|---|---|---|---|
| 1,913,795 | 6/1933 | Deisch | 359/258 |
| 3,408,133 | 10/1968 | Lee | 359/258 |
| 3,521,069 | 7/1970 | De Maria et al. | 372/17 |
| 3,588,749 | 6/1971 | Meyer | 359/258 |
| 3,619,637 | 11/1971 | Goto | 359/328 |
| 3,675,022 | 7/1972 | Nelson et al. | 359/247 |
| 3,701,956 | 10/1972 | Simmons | 372/12 |
| 4,059,759 | 11/1977 | Harney et al. | 359/247 |
| 4,061,985 | 12/1977 | Siebert . | |
| 4,761,050 | 8/1988 | Byron | 372/27 |
| 4,930,873 | 6/1990 | Hunter . | |
| 4,976,930 | 12/1990 | Kishida et al. | 359/328 |
| 5,111,326 | 5/1992 | Ball | 359/258 |
| 5,117,126 | 5/1992 | Geiger | 359/328 |
| 5,121,250 | 6/1992 | Shinozaki et al. | 359/328 |

FOREIGN PATENT DOCUMENTS

| | | | |
|---|---|---|---|
| 100423 | 3/1937 | Australia | 359/258 |
| 359213 | 3/1990 | European Pat. Off. . | |
| 256930 | 5/1988 | Germany . | |
| 2-96718 | 4/1990 | Japan | 359/258 |

OTHER PUBLICATIONS

Bloom et al, "Conjugate Wave–Front Generation and Image Reconstruction By Four Wave Mixing," *Applied Physics Letters*, vol. 31, No. 9, Nov. 1, 1977, pp. 592 to 594.

Burdette et al, "Frequecy Shifting of Light by Means of a Kerr Cell," *American Journal of Physics*, vol. 38, No. 11, Nov. 1970, pp. 1326 to 1330.

Stavola et al, "Ultrafast Pulse Shaping with a Travelling Wave Kerr Cell and Picosecond Rise Time Electrical Pulses," *Applied Optics*, vol. 18, No. 24, Dec. 15, 1979, pp. 4101–4105.

Gribkov et al, "Kerr Cell for High–Frequency Modulation of Laser Radiation," *Instrum. and Exp. Tech.*, No. 4, Jul.–Aug. 1970, pp. 1206 to 1209.

(List continued on next page.)

*Primary Examiner*—Georgia Y. Epps
*Attorney, Agent, or Firm*—Kriegsman & Kriegsman

[57] ABSTRACT

A multiple-stage optical Kerr gate system for gating a probe pulse of light. In a first embodiment, the system includes at least two optical Kerr gates, each Kerr gate including a polarizer, an optical Kerr cell actuable by a pump pulse, and an analyzer. In a second embodiment, at least one of the Kerr cells may be eliminated by arranging the respective sets of polarizers and analyzers so that they share a common Kerr cell. Gated pulses obtained using the present system typically have a signal to noise ratio that is at least 500 times better than that for gated pulses obtained using a single optical Kerr gate system. The system of the present invention may also include means for causing the pump pulse to arrive at the second Kerr cell (in the case of the first embodiment) or at a single Kerr cell a second time (in the case of the second embodiment) non-synchronously with the arrival of the probe pulse thereat. In this manner, gated pulses may be obtained that are much shorter in duration than pulses gated with a single optical Kerr gate system.

1 Claim, 11 Drawing Sheets

OTHER PUBLICATIONS

Bloom et al, "Sub–Picosecond Optical Gating by Optical Wavefront Conjugation," *Conference on Picosecond Phenomena,* Hilton Head, S.C., 24 to 26 May, 1978, pp. 96 to 98.

Boiko et al, "Low–Loss and High–Contrast Kerr Shutters," *Soviet Physics—Lebedev Institute Rep.,* No. 11, 1977, pp. 1 to 5.

Herriott et al, "Folded Optical Delay Lines," *Applied Optics,* vol. 4, No. 8, Aug. 1965, pp. 883 to 889.

MULTIPLE-STAGE OPTICAL KERR GATE SYSTEM

This is a division of application Ser. No. 07/784,220, filed Oct. 30, 1991, now U.S. Pat. No. 5,227,912.

BACKGROUND OF THE INVENTION

The present invention relates generally to optical Kerr gate systems and more particularly to a multiple-stage optical Kerr gate system.

Optical Kerr gate systems have become well-known over the past twenty years, having been used primarily as simple ultrafast shutters to measure ultrafast events and relaxation processes in applications as varied as imaging, communications, and digital computation. Generally speaking, an optical Kerr gate system comprises a light source for producing an intense gating pulse and an optical Kerr gate comprising a non-linear medium (i.e. a Kerr cell) disposed between a pair of crossed polarizers (the second polarizer often referred to as an analyzer). In the absence of a gating pulse sent contemporaneously through the Kerr cell, a signal pulse of arbitrary polarization entering the Kerr gate along its longitudinal axis will not emerge therefrom. This is because the signal pulse will be polarized in a first direction by the first polarizer, will go unchanged through the Kerr cell, and, will be blocked from passage by the analyzer. In contrast, if the gating pulse is directed onto the non-linear medium while the signal pulse is also incident thereonto, a transient birefringence is introduced into the Kerr cell, causing the signal pulse to become elliptically polarized and permitting at least a portion thereof to pass through the analyzer.

For a typical optical Kerr gate using a pair of Polaroid sheet polarizers, gated pulses having a signal to noise ratio (S/N) of approximately $2 \times 10^3$ and a time duration of approximately 8–16 picoseconds (ps) can frequently be achieved using a 10 ps gating pulse from a mode-locked glass laser. Using a 100 femtosecond (fs) gating pulse from a dye laser and either lead glass or a polymer as the Kerr medium. 100 fs gates can be achieved. Unfortunately, in numerous applications, such as in the time-gated optical imaging of various biological and medical specimens, gated pulses having higher S/N ratios (frequently as high as or greater than $10^{10}$) and shorter durations than noted above are often desirable.

SUMMARY OF THE INVENTION

It is an object of the present invention to provide a new and improved optical Kerr gate system.

It is another object of the present invention to provide an optical Kerr gate system which can be used to produce gated pulses having a higher signal to noise ratio than can typically be attained using existing optical Kerr gate systems.

It is still another object of the present invention to provide an optical Kerr gate system which can be used to produce gated pulses having a shorter duration than can typically be attained using existing optical Kerr gate systems.

Additional objects of the present invention will be set forth in part in the description which follows, and in part will be obvious from the description or may be learned by practice of the invention. The objects of the invention may be realized and attained by means of the instrumentalities and combinations particularly pointed out in the appended claims.

According to one feature of the invention, an optical Kerr gate system is provided which includes two or more optical Kerr gates, or alternatively, two or more sets of polarizers and analyzers which share a common optical Kerr cell. Such optical Kerr gate systems can be used to produce gated pulses which have a signal to noise ratio of at least 500 times greater than that which can typically be achieved using existing optical Kerr gate systems, which include only a single optical Kerr gate. More specifically, the improvement in the signal to noise ratio typically approaches a factor of $(500)^m$ where m equals the number of additional optical Kerr gates or the number of additional sets of polarizers and analyzers.

According to another feature of the present invention, an optical Kerr gate system is provided as described above which includes means for causing the gating (i.e. pump) pulse and the signal (i.e. probe) pulse to arrive non-synchronously at the second optical Kerr cell (in the case wherein at least two optical Kerr gates are provided) or at the common optical Kerr cell the second time they are routed therein (in the case wherein at least two sets of polarizers and analyzers are arranged so as to share a common optical Kerr cell). Such optical Kerr gate systems can be used to produce gated pulses having a duration of at least 4 times shorter than that which can typically be achieved using existing optical Kerr gate systems.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In these drawings wherein like reference numerals represent like parts:

FIG. 2(a) is a view of another embodiment of an optical delay unit usable in the system in FIG. 2;

DETAIL DESCRIPTION OF PREFERRED EMBODIMENTS

Figure 1:
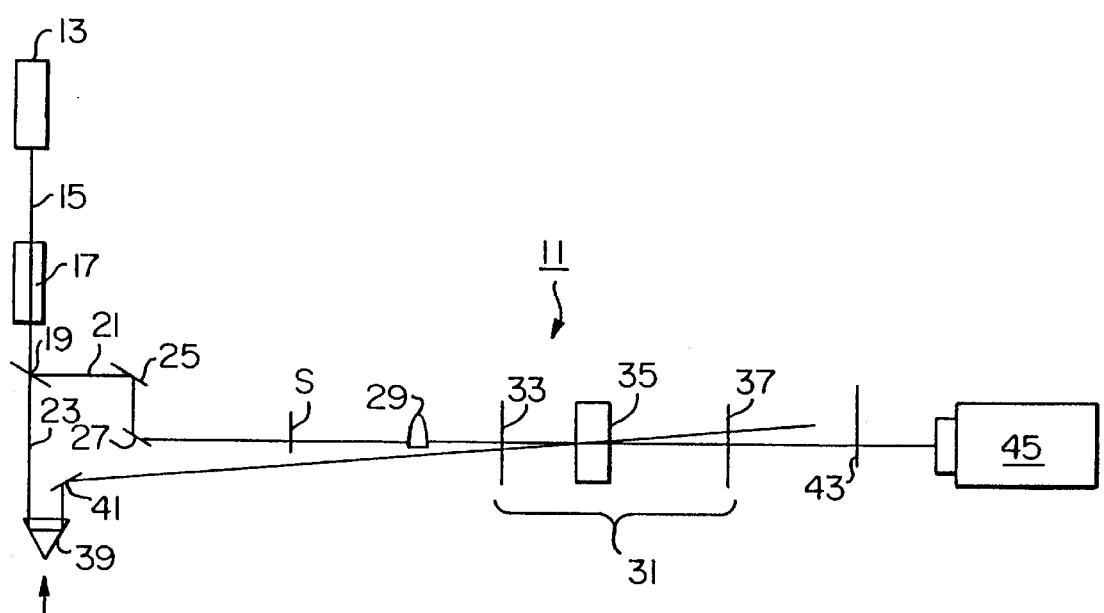
FIG. 1 is a schematic diagram of an experimental set-up which includes a conventional optical Kerr gate system.

Referring now to FIG. 1, there is illustrated an experimental set-up which includes a conventional optical Kerr gate system, the set-up being represented generally by reference numeral 11.

Set-up 11 includes a laser 13, such as a Nd:glass mode-locked laser, for generating a pulse train along a path 15 at a wavelength of 1054 nm and with a pulse duration of 10 picoseconds. The pulse train is transmitted through a potassium dihydrate phosphate (KDP) crystal 17, which generates a second harmonic pulse train along path 15 at a wavelength of 527. The pair of pulse trains are then split by a beam splitter 19 into a probe beam propagating along a path 21 and a pump beam propagating along a path 23. The probe beam is reflected off a pair of mirrors 25 and 27 and is then used to illuminate a sample S disposed along path 21. The light from sample S is collected by a lens 29 and focused onto a conventional Kerr gate 31 comprising a polarizer 33, a Kerr cell 35, and an analyzer 37. The pump beam is sent into a delay line 39 and then reflected off a mirror 41 onto Kerr gate 31. As described above, when the pump beam and the probe beam arrive simultaneously at Kerr gate 31, at least a portion of the probe beam is caused to pass through analyzer 37. In this manner, the pump beam interacts with Kerr gate 31 so as to serve as a shutter for gating the probe beam. The gated probe beam is then passed through a narrow band filter 43, and the filtered light is time-resolved using an image intensified CCD camera 45.

One shortcoming with conventional optical Kerr gate systems, such as is seen in set-up 11, is that they are typically limited to producing gated pulses having a signal ti noise ratio of only about $2 \times 10^3$. In addition, such systems typically suffer from the limitation that, if a gating pulse of about 10 picoseconds is used, gated pulses no shorter than about 8–16 picoseconds can be produced.

Figure 2:
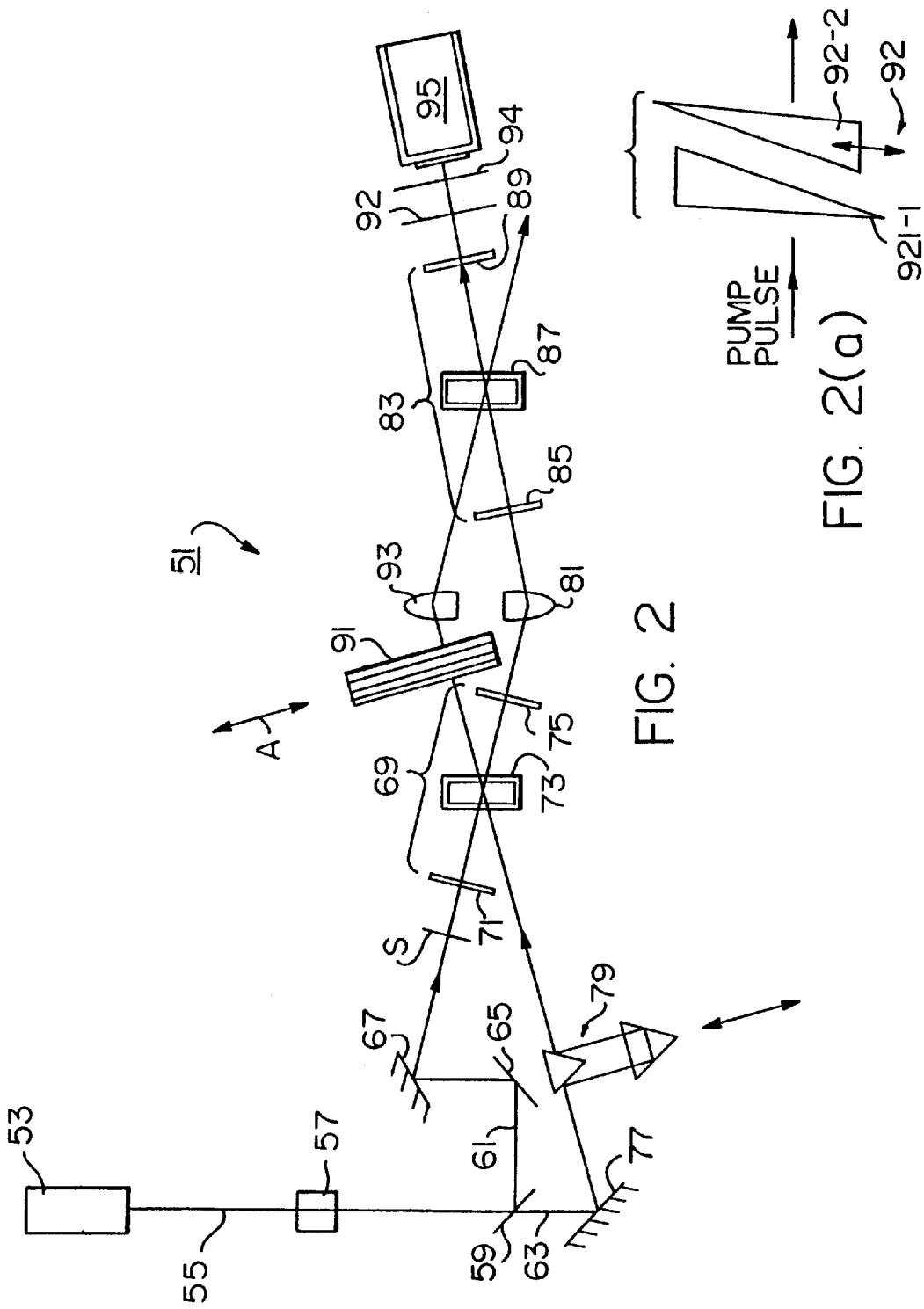
FIG. 2 is a schematic diagram of an experimental set-up which includes one embodiment of an optical Kerr gate system constructed according to the teachings of the present invention.

Referring now to FIG. 2, there is shown an experimental set-up which includes one embodiment of an optical Kerr gate system constructed according to the teachings of the present invention, the set-up being represented generally by reference numeral 51.

Set-up 51 includes a laser 53, such as a Nd:glass mode-locked laser, for generating a pulse train along a path 55 at a wavelength of 1054 nm and with a pulse duration of 10 picoseconds. The pulse train is transmitted through a potassium dihydrate phosphate (KDP) crystal 57, which generates a second harmonic pulse train along path 55 at a wavelength of 527 nm. The pair of pulse trains are then split by a 50/50 beam splitter 59 into a probe beam propagating along a path 61 and a pump beam propagating along a path 63. The probe beam is reflected off a pair of mirrors 65 and 67 and is then used to illuminate a sample S disposed along path 61. The light from sample S is transmitted to a first Kerr gate 69 comprising a polarizer 71, a Kerr cell 73, and an analyzer 75. The pump beam is reflected off a mirror 77, sent through an optical delay unit 79, and then transmitted to Kerr cell 73. As described above, when the pump beam and the probe beam arrive simultaneously at Kerr gate 69, at least a portion of the probe beam is permitted to pass through analyzer 75. In this way, the probe pulse is gated by the pump pulse and Kerr gate 69.

After emerging from analyzer 75, the gated probe pulse is focused by a lens 81 onto a second Kerr gate 83, comprising a polarizer 85, a Kerr cell 87, and an analyzer 89. The pump pulses in turn, is focused by a lens 93 onto Kerr cell 87. To delay the arrival of the pump pulse at Kerr cell 87 relative to the arrival of the probe pulse thereat, an optical delay unit in the form of a stack of glass slides 91 are positioned between Kerr cell 73 and lens 93. Slides 91 are movable in the direction shown by arrows A. By positioning stack 91 so that the pump pulse does not propagate through stack 91, the probe pulse and the pump pulse are caused to arrive at Kerr cell 87 synchronously (i.e. at virtually the same time, disregarding any delay caused by the difference in time it takes the probe pulse and the pump pulse, which have different wavelengths, to propagate through Kerr cell 73 and lenses 81 and 93). One result of a synchronous arrival of the pump and probe pulses at Kerr cell 87 is that the duration of the probe pulse is shortened by a very small amount or not at all by Kerr gate 83. In contrast, by positioning slides 91 so that the pump pulse is caused to travel therethrough (as seen in FIG. 2), the pump pulse is delayed. As a result are caused to arrive at Kerr cell 87 non-synchronously (i.e. so that the periods of time during which the respective pulses are present at Kerr cell 87 overlap only partially). One result of a non-synchronous arrival at Kerr cell 87 is that the duration of the probe pulse is shortened to approximately the duration of the overlap. After emerging from analyzer 89, the probe pulse is passed through a neutral density filter 92 and a narrow band filter 94 and is then time-resolved by an image intensified CCD camera 95. The amount of the delay caused by stack 91 can be changed by changing the thickness of the individual glass slides in the stack or by changing the number of slides in the stack.

Instead of a stack of glass slides, the pump pulse can be delayed by using a delay unit 92 in the form pair of a pair of glass wedges 92-1 and 92-2 positioned along the pump beam path as shown in FIG. 2(a) with one wedge, each as wedge 92-2 being movable relative to the other in the direction shown by arrows C—C. The advantage of this arrangement is that it produces a delay whose duration can be easily varied. The delay can be eliminated by moving delay unit 92 out of the beam path. Similarly, a delay unit such as optical delay unit 79 can be employed.

Figure 3:
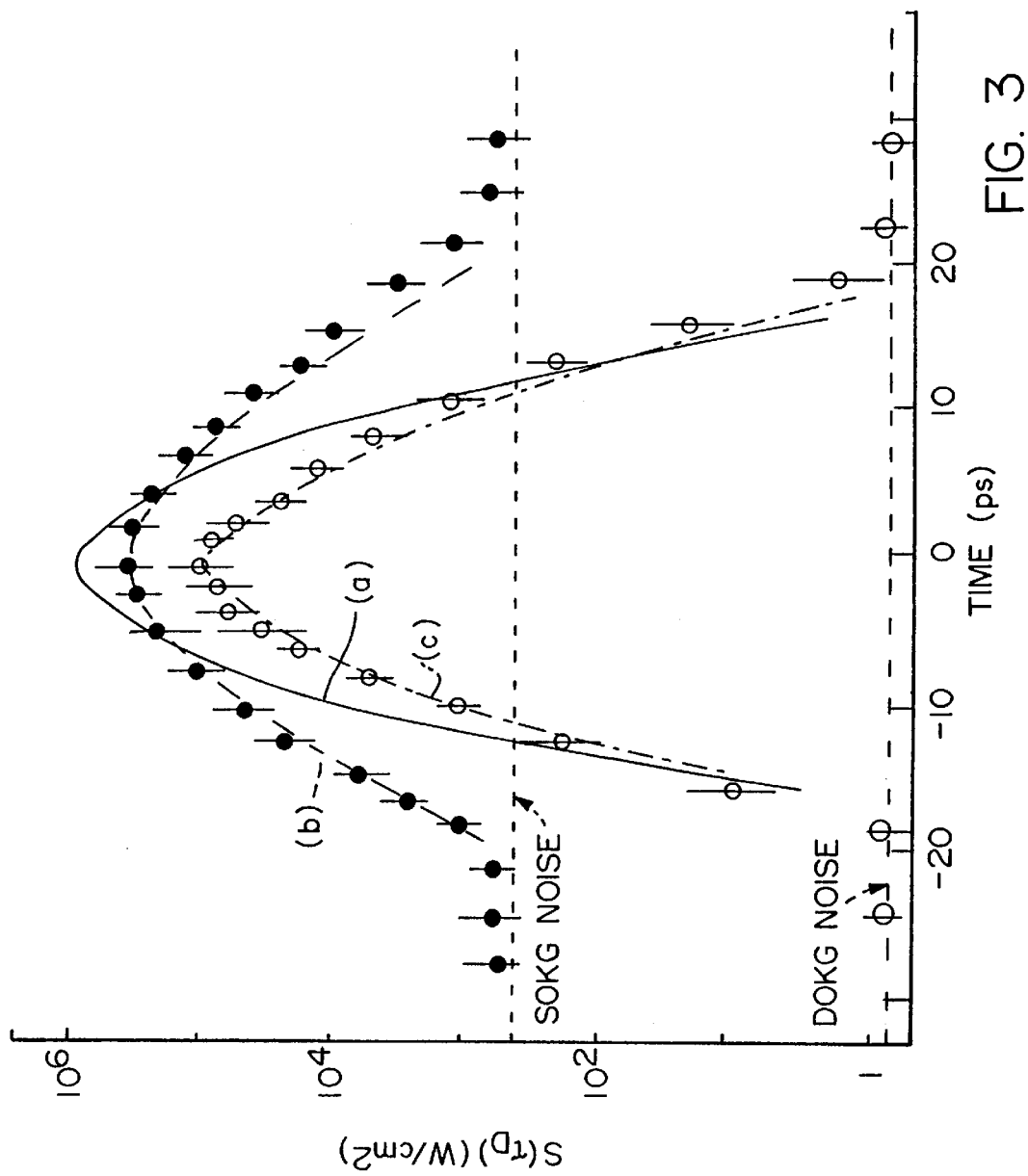
FIG. 3 is a graph depicting the intensity of light as a function of time for a pair of light pulses which have been gated using the set-up of FIG. 1 and the set-up of FIG. 2 in the non-synchronous mode.

Referring now to FIG. 3, there are shown typical transmitted signals measured as a function of the gating time for a conventional single optical Kerr gate system (SOKG), such as is seen in set-up 11, and for an optical Kerr gate system having a pair of Kerr gates (DOKG), such as is seen in set-up 51. Due to the limitation of 256 counts dynamic region of the detection system used, the transmitted signals were attenuated down $4 \times 10^3$ times. The time zero was chosen to be the maximum transmitted signal which was about a 2 ps difference between SOKG and DOKG. The standard deviation for the measured signal was about 10%. For the SOKG, the gating intensity was about 0.2 GW/cm$^2$, the $e^{-1}$ decay time was about 8 ps, the leaking noise level was about 700, and the maximum transmission efficiency was about 60%. For the DOKG, the gating intensity of the first Kerr cell was about 1.2 GW/cm$_2$, the gating intensity of the second Kerr cell was about 0.8 GW/cm$^2$, the difference in the gating times of the two Kerr gates, δt, was about 12 ps, the $e^{-1}$ decay time was about 5.6 ps, and the maximum transmission efficiency was about 10%. The noise level of the DOKG was 2±1 counts (mainly from ICCD camera internal noise) at the input probing pulse intensity of about $10^6$ W/cm$^2$.

The solid line (a) is a calculated curve of the laser pulse profile which is a Gaussian function $10^6$ V/cm$^2$ exp($-t^2/5^2$). The dashed line (b) and the dashed-dotted line (c) are calculated from the equation $$S(\tau_D)' = S_1^{-1} \int_{-\infty}^{\infty} <E_1^2(t-\tau_D)> T^{s,d}(t)dt \quad (1)$$

where $T^{s,d}(t)$ is an optical transfer function with the superscript s corresponding to an SOKG wherein $T^s(t) = \sin^2[\pi L/$ $\lambda\delta n(t)$] and the superscript d corresponding to a DOKG wherein $T^d(t)=\sin^2[\pi L_1/\lambda\delta n(t_1)]\sin^2[\pi L_2/\lambda\delta n(t_2)]$. The value of $$S_1 = \int_{-\infty}^{\infty} <E_1^2(t)> dt$$

is the normalized probing pulse intensity and the induced phase change $\delta\phi=2\pi L/\lambda\delta n$. The value of $\tau_D$ is the delayed gating time between the gating pulse and the probing pulse, and $\tau_1$ is the $e^{-1}$ decay time of the probing pulse.

The flat broken line represents the noise level caused by the light leakage in the single Kerr gate system (SOKG). The noise level of the double Kerr gate system (DOKG) is plotted as the base line. The measured signal to noise ratio for the SOKG is $1.5\times10^3$ and for the DOKG is $5\times10^5$. The improvement in the signal to noise ratio for the DOKG system arises from the reduction of noise, primarily caused by the leakage of light through inferior crossed polarizers. The system extinction ratio, $\epsilon$, which is defined as $I_{parallel}$ (polarizer and analyzer oriented in same direction)/$I_{crossed}$ (polarizer and analyzer crossed), represents the ability of the system to reject leakage noise. For the SOKG system, the maximum $\epsilon$ was $2.5\times10^3$, and for the DOKG system, the maximum $\epsilon$ was $7\times10^5$.

Figure 4:
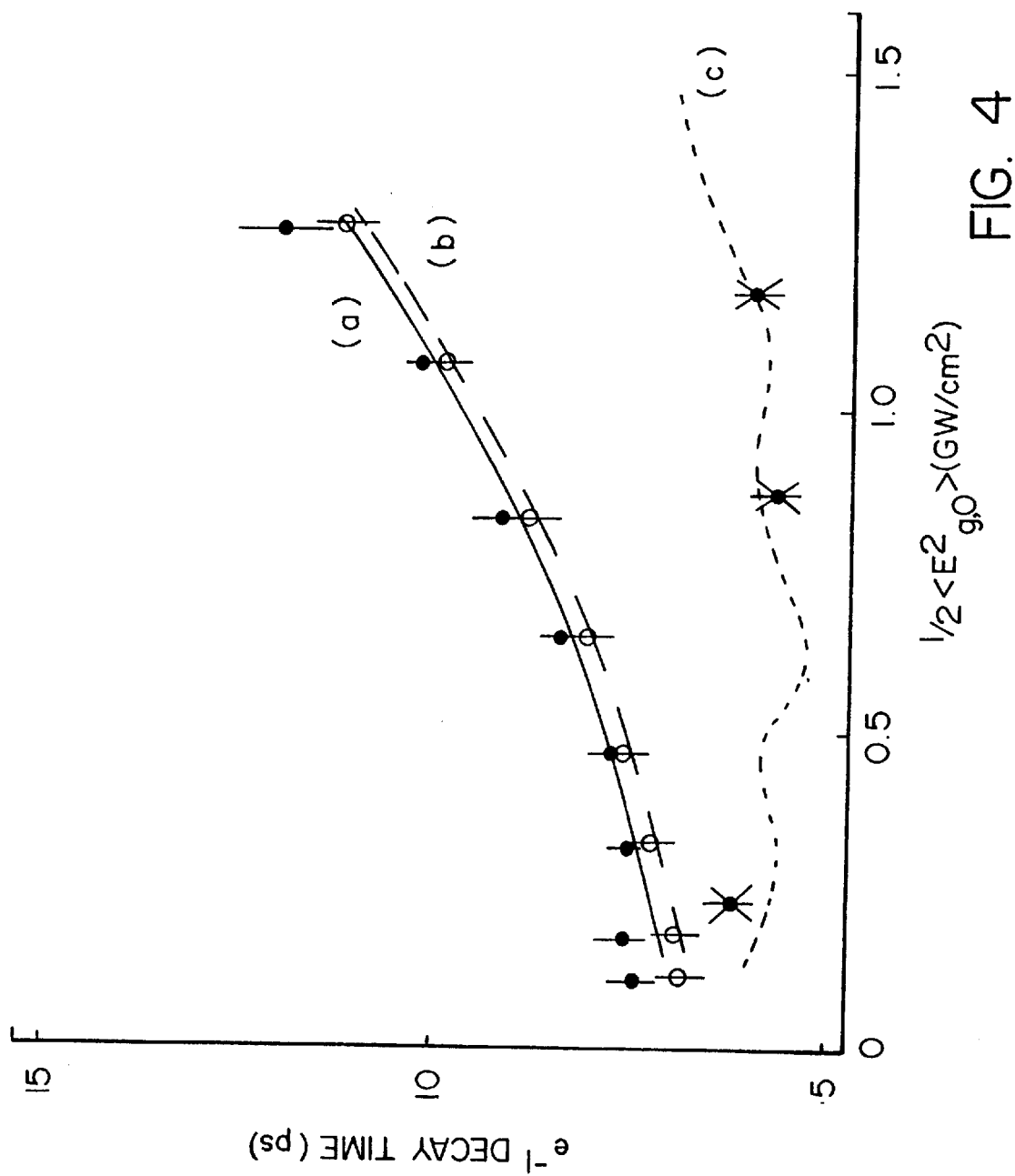
FIG. 4 is a graph depicting the decay time of a gated transmitted pulse signal as a function of gating intensity using the set-up of FIG. 1 and the set-up of FIG. 2 in both the synchronous and non-synchronous modes.

Referring now to FIG. 4, there are shown the experimental results for the $e^{-1}$ decay time of the gated transmitted pulse signal as a function of the gating intensity for the SOKG system, for the DOKG system set up so that the gated probe pulse and the pump pulse arrive synchronously at the second Kerr cell (SDOKG), and the DOKG system set up so that the gated probe pulse and the pump pulse arrive non-synchronously ($\delta t=9$ ps) at the second Kerr cell (NDOKG). The lines (a), (b), and (c) are calculated curves obtained from equation (1) above for SOKG, SDOKG, and NDOKG ($\delta t=9$ ps), respectively. The salient feature to be extracted from FIG. 4 is that, as the gating pulse became more intense, the $e^{-1}$ gating time increased for both SOKG and SKOKG but decreased sharply for NDOKG. When the intensity was about 1 GW/cm$^2$, the $e^{-1}$ times for the SOKG and the SDOKG were about 13.5 ps and 12 ps, respectively. When the gating pulse intensity was about 1.2 GW/cm$^2$ for the first Kerr cell and about 0.8 GW/cm$^2$ for the second Kerr cell for the NDOKG, the $e^{-1}$ decay time of the gated transmitted signal was about 5.6 ps. This value is a factor of two better than that obtained from the SOKG and the SDOKG systems.

Figure 5A:
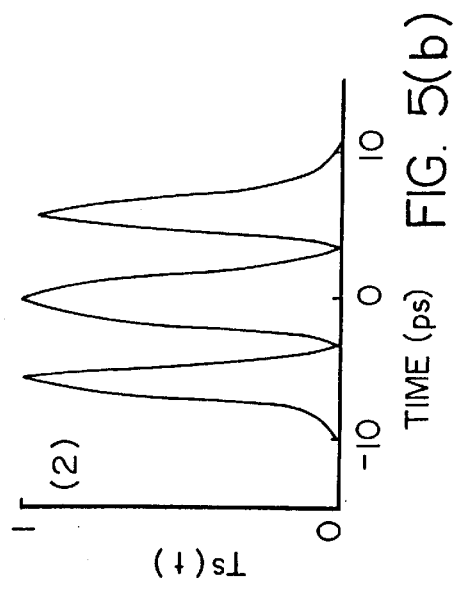
FIGS. 5(a) through 5(f) are a series of calculated temporal profiles of optical transfer function at two different gating intensities using the set-up of FIG. 1 and the set-up of FIG. 2 in both the synchronous and non-synchronous modes.
Figure 5B:
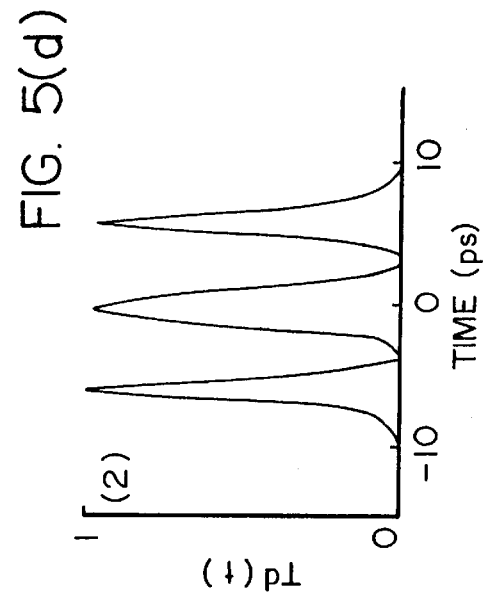
Figure 5C:
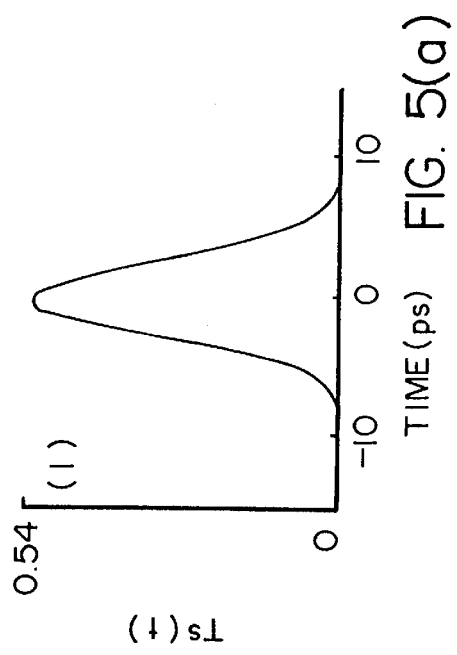
Figure 5D:
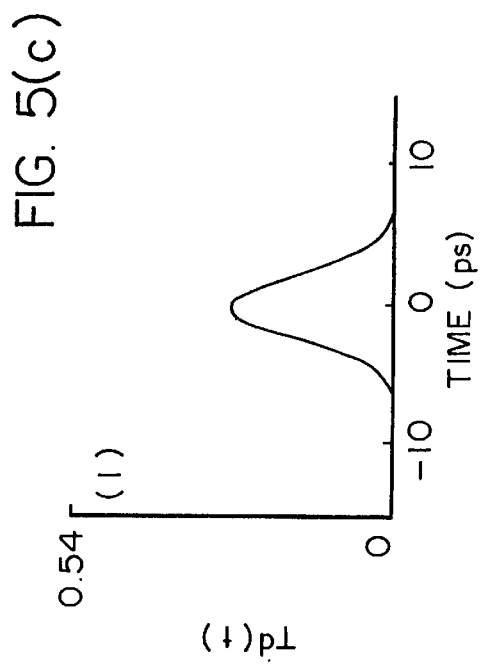
Figure 5E:
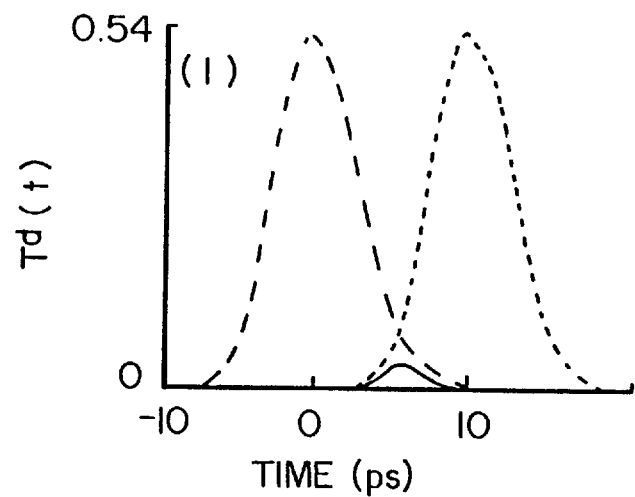
Figure 5F:
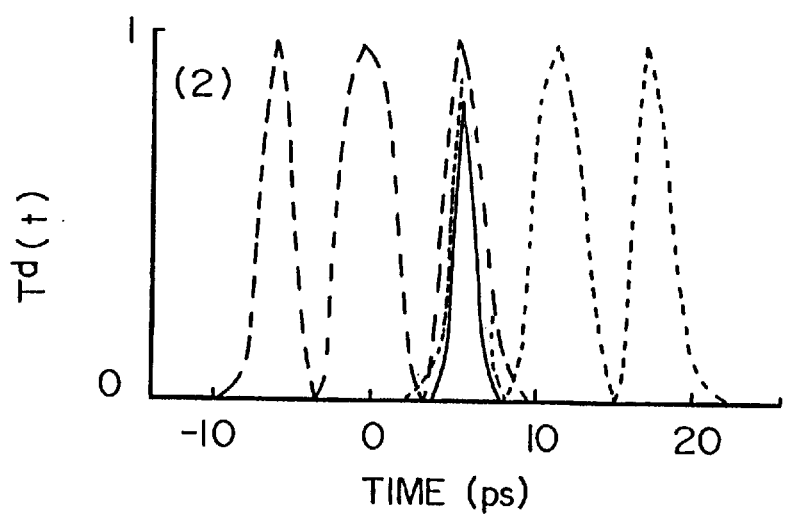

Referring now to FIGS. 5(a) through 5(f), there are shown several calculated temporal profiles of the optical transfer function T(t) from equation (1) above at two different gating intensities 270 MW/cm$^2$ and 1.6 GW/cm$^2$ for the SOKG system (FIGS. 5(a) and 5(b), respectively), the SDOKG system (FIGS. 5(c) and 5(d), respectively). and the NDOKG system (FIGS. 5(e) and 5(f), respectively, with $\delta t=11$ wherein $\tau_g=5$ ps, $\tau_o(CS_2)=1.8$ ps, $n_2 0=1.6\times10^{-11}$ esu and $n_2^e=0.25n_2^o$. As can be seen, the transfer function becomes broadened and oscillating for both the SOKG and NDOKG systems but narrower for the NDOKG. The dashed curves is FIGS. 5(e) and 5(f) originated from an individual gate of the NDOKG. This dramatic change of the temporal distribution of T(t) for the NDOKG in comparison to the other systems id due to the non-synchronized overlapping of two induced phase shifts in two Kerr cells. For FIG. 5(f), the partial overlap in time from these two oscillating Kerr gates leads to a significant reduction in the overall system gating time.

The shape, width, and the transmission efficiency of the transmitted pulse signal can be strongly influenced by t(t).

When measured by a slow response photodetector, the gating and probing pulses are convoluted through the integration of equation, (1) at a particular delay time $\tau_D$. At lower gating intensity ($\delta\phi\mu\pi$). The transmission efficiency is approximately proportional to the intensity of the gating pulse. When the gating pulse is more intense, the gating time will be broadened (see FIGS. 5(b) and 5(d)) and the transmission efficiency is higher. The temporal profile of the transmitted probing pulse will significantly change. For a SOKG, the measured maximum transmission was about 60% when the gating pulse reached about 0.5 GW/cm$^2$ in a 1 cm CS$_2$ Kerr cell. This calculation is consistent with the broadened and oscillating optical Kerr gate.

When the $e^{-1}$ decay time of the T(t) increased, the $e^{-1}$ width of s($t_D$ also increased. Due to the convolution of the probing pulse and $T^{s,d}(t)$ in equation 1), the measured gating times of DOKG shown in FIG. 4 (curves b and c) were only slightly narrower (about 10–50%) than the gating time of SOKG. When the gating pulse intensity is $\geq 0.5$ GW/cm$^2$, the $e^{-1}$ decay time of the gate signal is approaching that of the input probing pulse. However, from the calculated transfer function of NDOKG shown in FIGS. 5(e) and 5(f), the true gating time is such smaller than the convoluted transmitted signal shown in FIG. 4' (curve c). In principle, the reduced gating times in curve c of FIG. 4 can be measured using a shorter probing pulse or a transient detection system. The temporal width of the transient probing pulse is directly proportional to T(t) and is much narrower than the integrated transmitted signal. The true gating width from this NDOKG is 3.3 times faster than that of the input laser gating pulse.

Figure 6A:
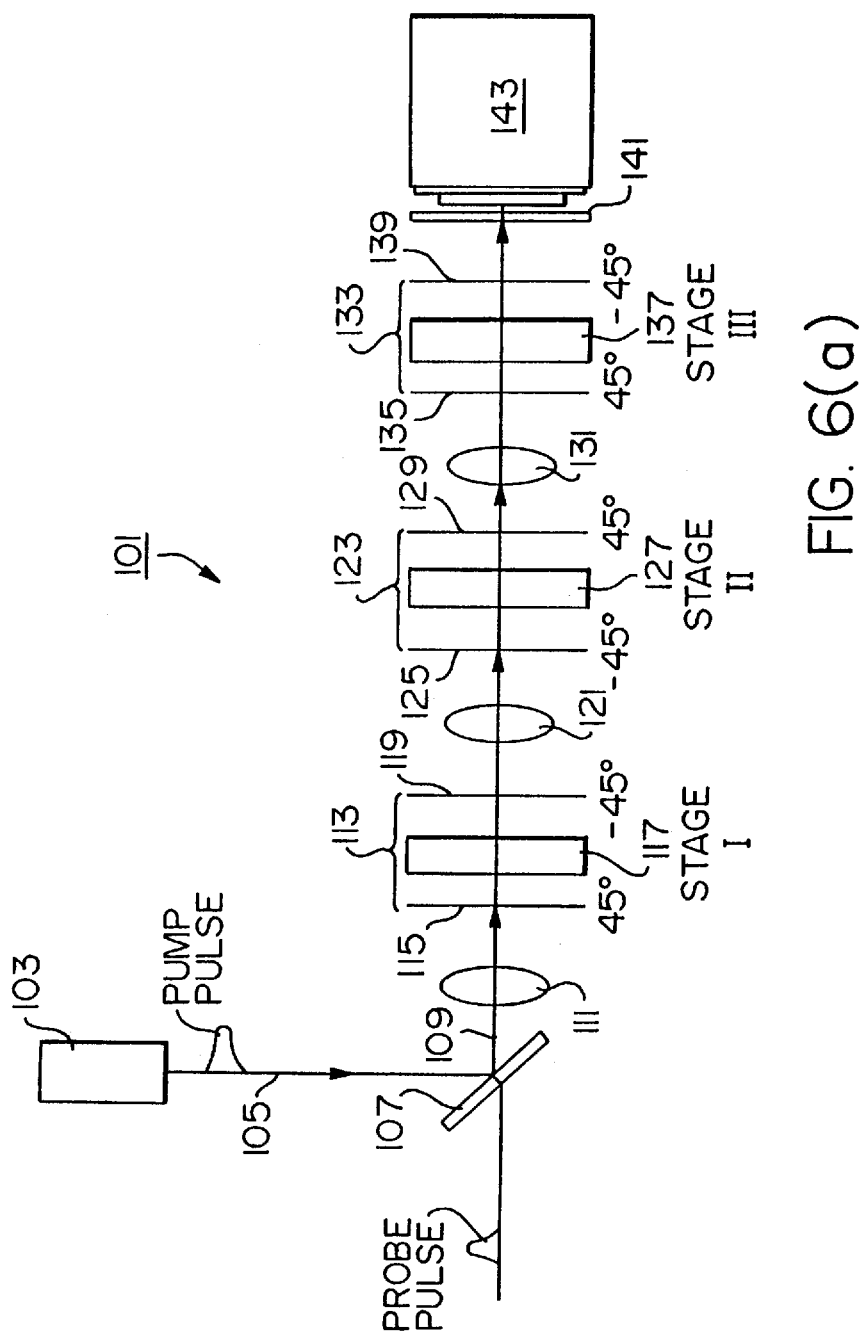
FIGS. 6(a) and 6(b) are schematic diagrams of second and third embodiments of an optical Kerr gate system constructed according to the teachings of the present invention.

Referring now to FIG. 6(a), there is shown a second embodiment of an optical Kerr gate system constructed according to the teachings of the present invention, the system being represented generally by reference numeral 101.

System 101 includes a light source 103, such as a Nd:glass mode-locked laser, for generating a series of intense 1060 nm, 10 ps pump pulses along a path 105. A beam splitter 107 is used to combine the pump pulses with a series of 530 nm probe pulses to form a single beam, which is then transmitted along a path 109. The beam is focused by a lens 111 onto a first optical Kerr gate 113 (STAGE I), which comprises a polarizer 115, a Kerr cell 117, and an analyzer 119. To the extent that the pump and probe pulses arrive simultaneously at Kerr cell 117, the probe pulses become elliptically polarized and are enabled to pass through analyzer 119. The light emergent from Kerr gate 113 is then focused by a second lens 121 onto a second Kerr gate 123 (STAGE II), which comprises a second polarizer 125, a second Kerr cell 127, and a second analyzer 129. The light emergent from second Kerr gate 123 is then focused by a third lens 131 onto a third Kerr gate 133 (STAGE III), which comprises a third polarizer 135, a third Kerr cell 137, and a third analyzer 139. (It should be noted that additional stages, i.e., optical Kerr gates, may be added to system 101 after Kerr gate 133 and that system 101 is shown including three optical Kerr gates solely for illustrative purposes.) The light emergent from third Kerr gate 133 is then passed through a filter 141 and time-resolved by a CCD camera 143.

Figure 6B:
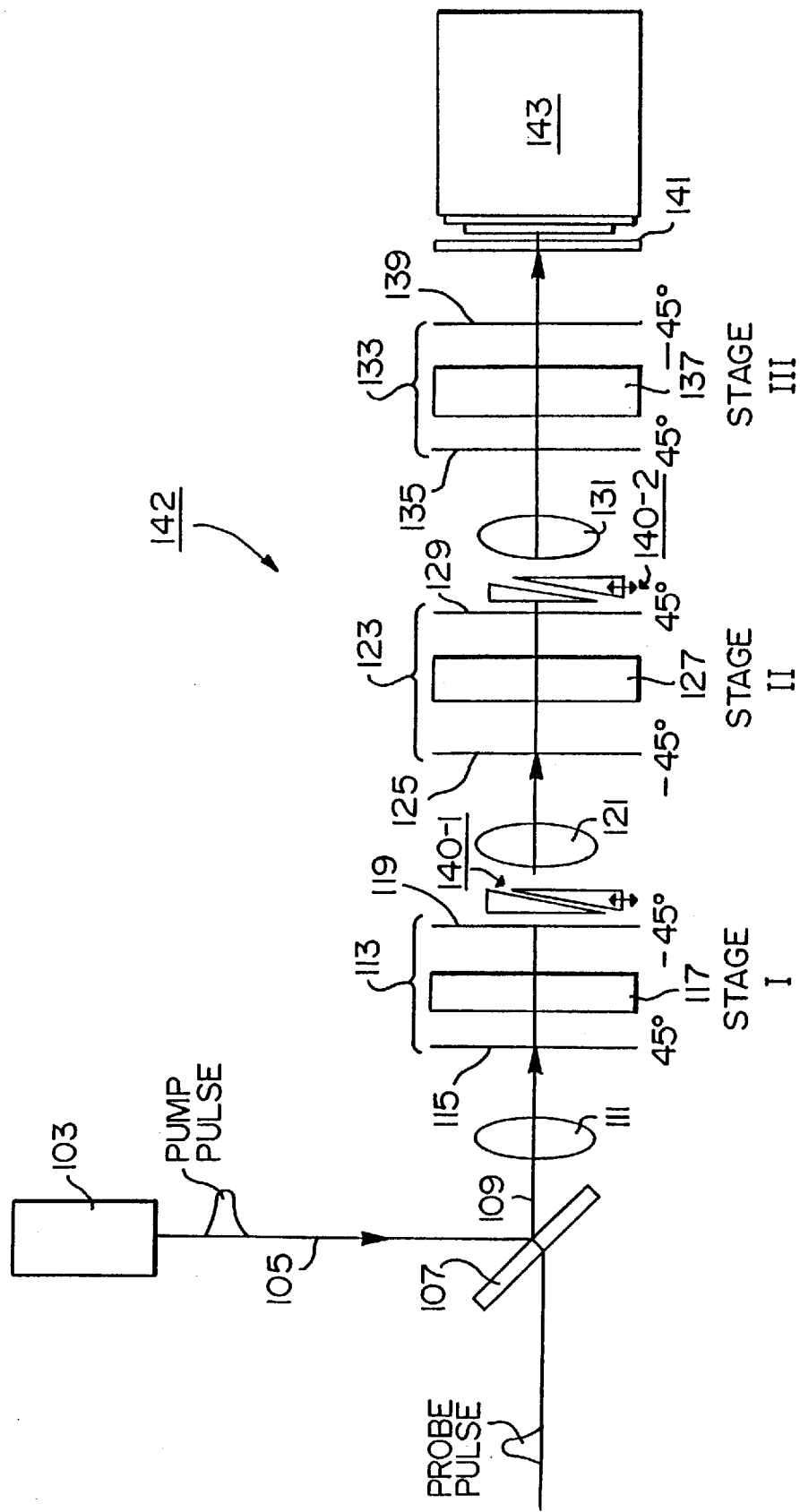

As is the case for the optical Kerr gate system of set-up 51, system 101 is capable of producing gated pulses which possess a signal to noise ratio that is improved as compared to single Kerr gate systems. In the case of system 101, the improvement in the signal to noise ratio is approximately by a factor of 250,000 (i.e. (500)$^2$). However, in contrast with the system of set-up 51, system 101 is not capable of producing pulses that are much shorter than those produced by single Kerr gate systems. This is because the Kerr gates of system 101 are arranged collinearly and the pump and probe pulses are made to propagate along the common axis. Consequently, the relative arrivals of the pump and probe pulses at Stage II and/or Stage III cannot be made to be non-synchronous. However, this deficiency can easily be remedied by placing one or more sets of stacked glass slides, pairs of glass wedges dielectric plates, or the like between the various Kerr gates along path 109 (see, for example, pairs of glass wedges 140-1 and 140-2 shown in FIG. 6(b)). Such materials serve to delay the arrival of the pump pulse relative to the probe pulse since the pump pulse, having a greater wavelength than the probe pulse, takes longer to travel therethrough.

Figure 7:
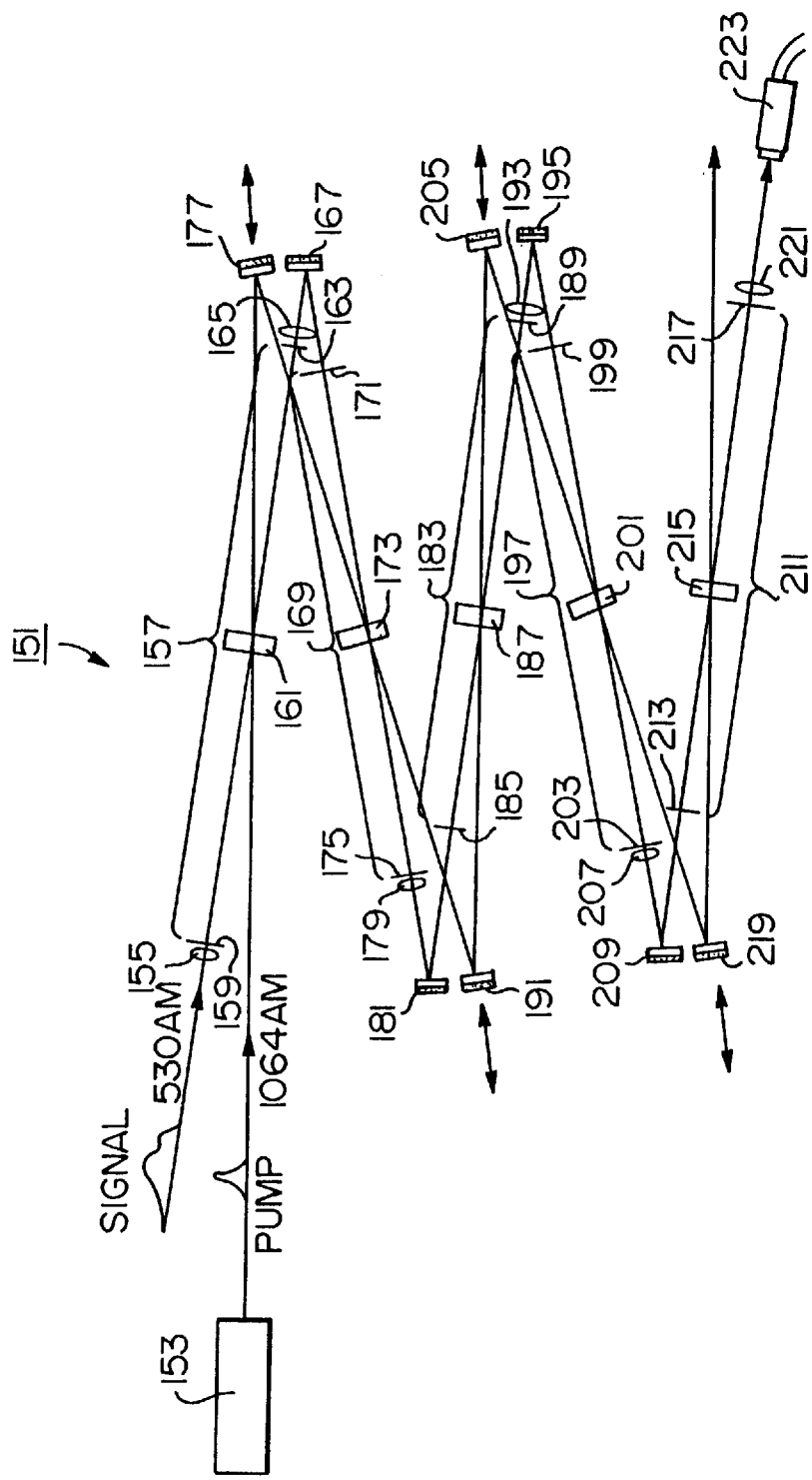
FIG. 7 is a schematic diagram of a fourth embodiment of an optical Kerr gate system constructed according to the teachings of the present invention.

Referring now to FIG. 7, there is shown a fourth embodiment of an optical Kerr gate system constructed according to the teachings of the present invention, the system being represented generally by reference numeral 151.

System 151 includes a light source 153, such as a Nd:g-lass mode-locked laser, for generating a beam of intense 1060 nm, 10 ps pump pulses. System 151 also includes a lens 155 for focusing a beam of 530 nm probe pulses onto a Kerr gate 157 comprising a polarizer 159, a Kerr cell 161, and an analyzer 163. The pump pulses from source 153 are passed through Kerr cell 161 so as to gate the probe pulse in the manner described above. The gated probe pulse emergent from Kerr gate 157 is then focused by a lens 165 and reflected off a mirror 167 onto a second Kerr gate 169 comprising a second polarizer 171, a second Kerr cell 173, and a second analyzer 175. Meanwhile, the pump pulse is transmitted to an adjustably mounted mirror, i.e., delay line 177, which can be used to cause the pump pulse to arrive at Kerr cell 173 either synchronously or non-synchronously with the probe pulse for the reasons discussed above. (As can well be appreciated, delay line 177 could be replaced with a fixed mirror and a plurality of slidably mounted stacked glass slides or similar material.)

After emerging from second Kerr gate 169, the probe pulse is focused by a third lens 179 and reflected off a mirror 181 onto a third Kerr gate 183 comprising a polarizer 185, a Kerr cell 187, and an analyzer 189. Meanwhile, the pump pulse is transmitted into an adjustable delay line 191, which is used to cause the pump pulse to arrive at Kerr cell 187 either synchronously or non-synchronously with the probe pulse. After emerging from third Kerr gate 183, the probe pulse is focused by a fourth lens 193 and reflected off a mirror 195 onto a fourth Kerr gate 197 comprising a polarizer 199, a Kerr cell 201, and an analyzer 203. Meanwhile, the pump pulse is transmitted into an adjustable delay line 205, which is used to cause the pump pulse to arrive at Kerr cell 201 either synchronously or non-synchronously with the probe pulse. After emerging from fourth Kerr gate 197, the probe pulse is focused by a lens 207 and reflected off a mirror 209 onto a fifth Kerr gate 211 comprising a polarizer 213, a Kerr cell 215, and an analyzer 217. Meanwhile, the pump pulse is transmitted into an adjustable delay line 219, which is used to cause the pump pulse to arrive at Kerr cell 215 either synchronously or non-synchronously with the probe pulse. After emerging from Kerr gate 211, the probe pulse is focused by a lens 221 onto a receiver 223.

System 151 is capable of producing gated pulses having a signal to noise ratio that is improved by a factor of approximately $6.25 \times 10^{10}$ (i.e. $(500)^4$) as compared to gated signals obtained using a single Kerr gate system. Moreover, by having the delay lines of system 151 set in the non-synchronous mode, system 151 can be used to produce gated pulses having a much shorter duration than gated pulses obtained using a single Kerr gate system.

Figure 8:
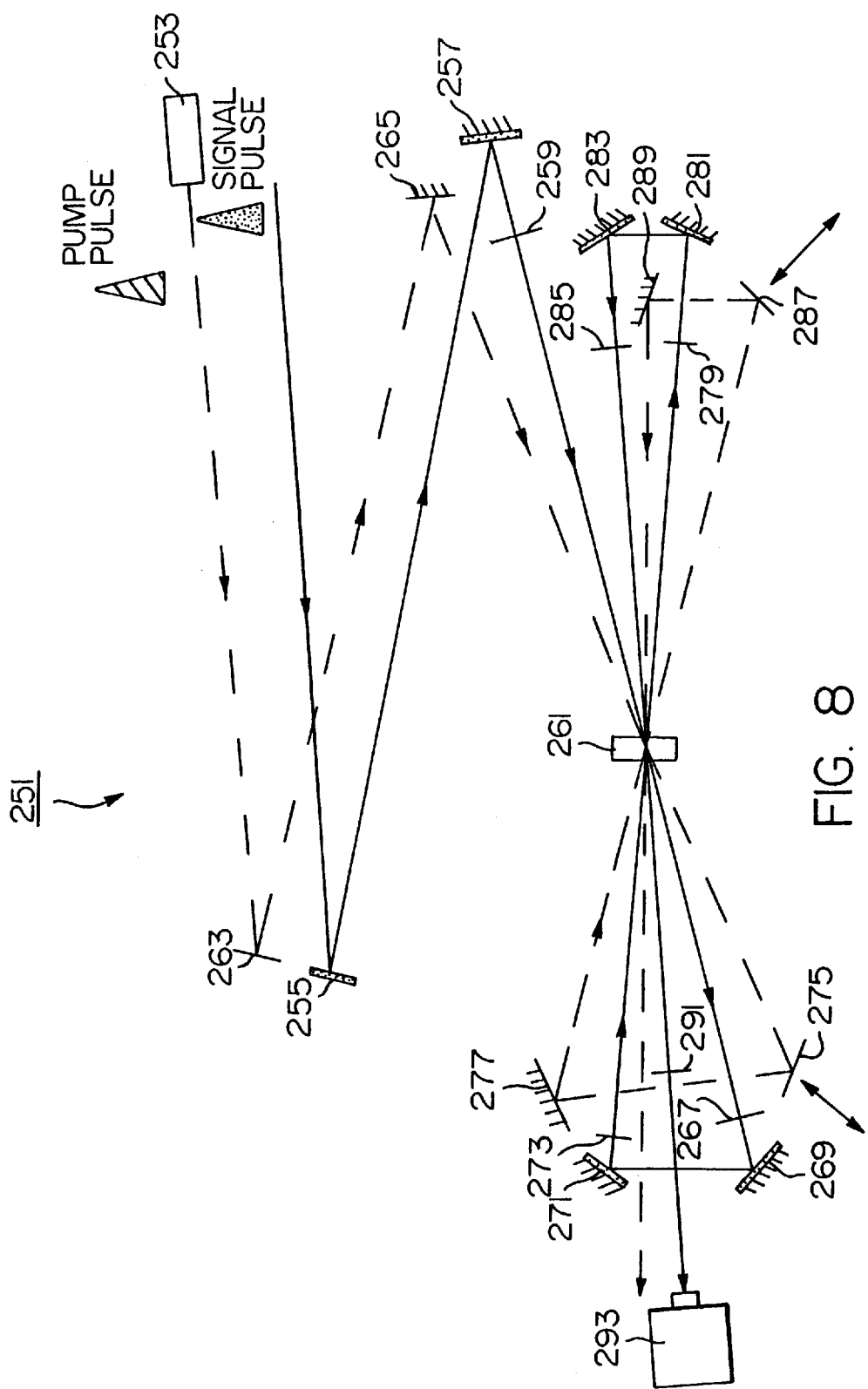
FIG. 8 is a schematic diagram of a fifth embodiment of an optical Kerr gate system constructed according to the teachings of the present invention.

Referring now to FIG. 8, there is shown a fifth embodiment of an optical Kerr gate system constructed according to the teachings of the present invention, the system being represented generally by reference numeral 251.

System 251 includes a light source 253 for generating a beam of intense pump pulses, the pump pulses being used to gate a signal pulse beam in the manner described below. The signal pulse beam is reflected off a pair of mirrors 255 and 257 onto a polarizer 259, which polarizes the beam in a first direction. The signal pulse beam is then transmitted to a Kerr cell 261. Meanwhile, the pump pulse beam is reflected off a pair of mirrors 263 and 265 onto Kerr cell 261 for the purpose of gating the probe pulse beam in the manner described above. The probe pulse beam is then transmitted through an analyzer 267, which is crossed relative to the polarizer 259. The probe pulse beam is then reflected off a pair of mirrors 269 and 271 onto a second polarizer 273, which is oriented parallel to analyzer 267. After passing through polarizer 273, the probe pulse beam is transmitted back to Kerr cell 261. Meanwhile, after passing through Kerr cell 261, the pump pulse beam is sent into a delay line 275 and reflected off a mirror 277 back onto Kerr cell 261. (As with system 151, delay line 275 is used to cause the pump pulse to arrive at the Kerr cell either synchronously or non-synchronously with the probe pulse and could be replaced with a fixed mirror and a plurality of slidably mounted stacked glass slides.) After passing through Kerr cell 261, the probe beam is then passed through an analyzer 279, which is crossed relative to polarizer 273. The probe beam is then reflected off a pair of mirrors 281 and 283 onto a third polarizer 285, which is oriented parallel to analyzer 279. After passing through polarizer 285, the probe beam is transmitted back to Kerr cell 261. Meanwhile, after passing through Kerr cell 261, the pump beam is sent into a delay line 287 and reflected off a mirror 289 back onto Kerr cell 261. The probe beam is then passed through a third analyzer 291, which is crossed relative to polarizer 285, and transmitted to a receiver 293.

As can readily be appreciated one benefit of the arrangement of components as in system 251 is that only one Kerr cell is required. Another benefit of the arrangement of components as in system 251 is that the overall size of the system may be considerably smaller as compared to the size of other systems.

Figure 9:
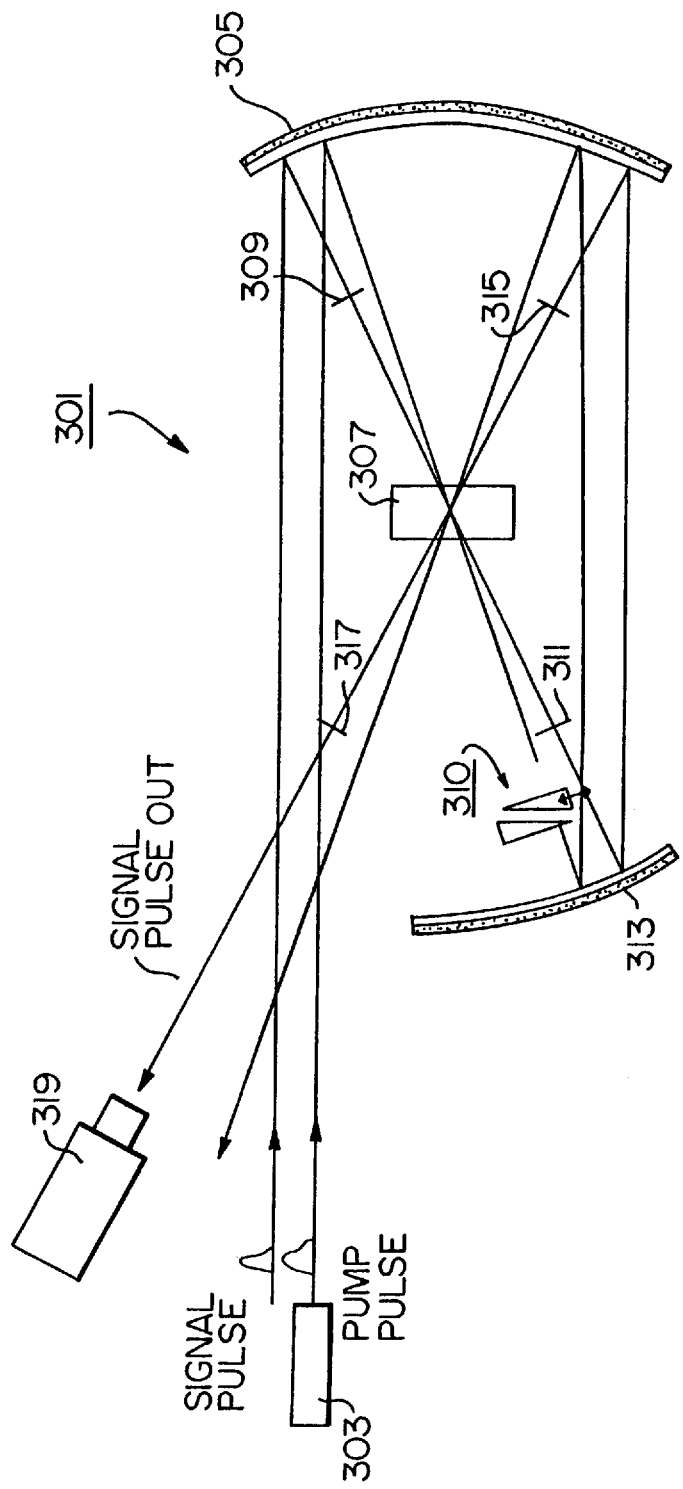
FIG. 9 is a schematic diagram of a sixth embodiment of an optical Kerr gate system constructed according to the teachings of the present invention.

Referring now to FIG. 9, there is shown a sixth embodiment of an optical Kerr gate system constructed according to the teachings of the present invention, the system being represented by reference numeral 301.

System 301 includes a light source 303 for producing a beam of intense pump pulses, the pump pulses being used to gate a beam of probe pulses in the manner described below. The pump and probe beams are focused by a concave mirror 305 onto a Kerr cell 307, the probe beam first passing through a polarizer 309 disposed between mirror 305 and Kerr cell 307. After passing through Kerr cell 307, the probe beam is passed through an analyzer 311, which is crossed relative to polarizer 309. The pump beam may be passed through a pair of suitably positioned glass wedges 310 for the purpose of delaying the pump beam relative to the probe beam. Both the pump beam and the probe beam are then reflected off a second concave mirror 313, which collimates the respective beams. The two beams are then reflected off mirror 305, which again focuses the beams onto Kerr cell 307, the probe beam first passing through a second polarizer 315, which is disposed between mirror 305 and Kerr cell 307 and which is oriented parallel to analyzer 311. After passing through Kerr cell 307, the probe beam is passed through a second analyzer 317, which is crossed relative to polarizer 315, and is then sent to a receiver 319.

While the foregoing disclosure has been directed in particular to optical Kerr gates, it should be noted that the principles of the present invention apply generally to all optical gates which contain a non-linear medium, and thus in addition to optical Kerr gates include gates such as up conversion gates, second harmonic gates and four phaton mixing gates. Accordingly, in FIG. 2 for example any one of these gates could be used in place of gate 69 and/or gate 83.

It is also to be understood that, while a single pump pulse has been used in the foregoing examples to actuate more than one optical Kerr cell, it is deemed to be within the skill of one of ordinary skill in the art to use multiple pump pulses to separately actuate distinct optical Kerr cells.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A multiple-stage optical gate adapted for use in gating a pulse of light comprising:

(a) a non-linear medium;

(b) first and second polarizers; and (c) first and second analyzers, said first and second analyzers being crossed relative to said first and second polarizers, respectively, and said second polarizer having a polarization axis parallel to that of said first analyzer, said first and second polarizers and said first and second analyzers being arranged relative to said non-linear medium so that said first polarizer, said non-linear medium and said first analyzer form a first optical gate and said second polarizer, said non-linear medium and said second analyzer form a second optical gate.

* * * * *